US008824699B2

(12) United States Patent
Derkx et al.

(10) Patent No.: US 8,824,699 B2
(45) Date of Patent: Sep. 2, 2014

(54) METHOD OF, AND APPARATUS FOR, PLANAR AUDIO TRACKING

(75) Inventors: Rene Martinus Maria Derkx, Eindhoven (NL); Cornelis Pieter Janse, Eindhoven (NL)

(73) Assignee: NXP B.V., Eindhoven (NL)

( * ) Notice: Subject to any disclaimer, the term of this patent is extended or adjusted under 35 U.S.C. 154(b) by 735 days.

(21) Appl. No.: 13/141,856

(22) PCT Filed: Dec. 21, 2009

(86) PCT No.: PCT/IB2009/055879
§ 371 (c)(1),
(2), (4) Date: Jun. 23, 2011

(87) PCT Pub. No.: WO2010/073212
PCT Pub. Date: Jul. 1, 2010

(65) Prior Publication Data
US 2011/0264249 A1    Oct. 27, 2011

(30) Foreign Application Priority Data
Dec. 24, 2008 (EP) .................................... 08106035

(51) Int. Cl.
| H04R 3/00 | (2006.01) |
| G10L 21/0208 | (2013.01) |
| H04R 1/40 | (2006.01) |
| G01S 3/808 | (2006.01) |
| G10L 21/0216 | (2013.01) |

(52) U.S. Cl.
CPC ............ *H04R 1/406* (2013.01); *G10L 21/0208* (2013.01); *G10L 2021/02166* (2013.01); *H04R 3/005* (2013.01); *H04R 2201/401* (2013.01); *G01S 3/8083* (2013.01)
USPC .......................................................... 381/92

(58) Field of Classification Search
USPC ........................................................... 381/92
See application file for complete search history.

(56) References Cited

U.S. PATENT DOCUMENTS 4,119,942 A   10/1978  Merklinger
5,664,021 A *  9/1997  Chu et al. ........................ 381/92
(Continued)

FOREIGN PATENT DOCUMENTS

| GB | 1395599 | 5/1975 |
| WO | 97/46048 A1 | 12/1977 |

OTHER PUBLICATIONS

Davies, S. "Bearing Accuracies for Arctan Processing of Crossed Dipole Arrays", Proc. OCEANS 1987, pp. 351-356 (1987).

(Continued)

*Primary Examiner* — Simon Sing

(57) ABSTRACT

A planar audio tracking system comprises a square array of four microphones ($M_1$, $M_2$, $M_3$, $M_4$) arranged as first and second cross-dipole microphones and a virtually constructed monopole microphone. The signals from these microphones undergo directional pre-processing and the results are applied to a filtered sum beamformer (FSB) (32). The FSB identifies functions ($h_d$ (0), $h_d$ ($\pi/2$), and $h_m$) of the FSB which are representative of impulse responses from desired audio source(s) to the first and second cross-dipole and the monopole microphone, respectively. The functions of the first cross-dipole and the monopole microphones and the functions of the second cross-dipole and the monopole microphones are cross correlated to produce respective estimates ($\psi_c(l)$ and $\psi_s(l)$) representative of the lag of the most dominant audio source. An angle-estimate ($\phi$) of the most dominant source is determined using the estimates of lag. Other embodiments of the tracking system may comprise 3 microphones arranged in a circular array and forming first and second cross-dipoles and a virtual monopole.

12 Claims, 4 Drawing Sheets

(56) References Cited

U.S. PATENT DOCUMENTS

| | | | |
|---|---|---|---|
| 6,041,127 A | | 3/2000 | Elko |
| 6,774,934 B1 | | 8/2004 | Belt et al. |
| 8,054,990 B2 * | | 11/2011 | Gratke et al. .................. 381/92 |
| 2005/0232440 A1 | | 10/2005 | Roovers |

OTHER PUBLICATIONS

Cox, H., et al. "Adaptive Cardioid Processing", Conf. Record of the 26th Asilomar Conf. on Signals, Systems and Computers, vol. 2, pp. 1058-1061 (Oct. 1992).

Chu, P. L., "Superdirective Microphone Array for a Set-top Videoconferencing System", IEEE Int'l. Conf. on Acoustics, Speech and Signal Processing, vol. 1, pp. 235-238 (1997).

Abel, J., et al. "Methods for Room Acoustic Analysis Using a Monopole-Dipole Microphone Array", Proc. InterNoise98, paper 123, 6 pages (1998).

Maranda, B., "The Statistical Accuracy of an Arctangent Bearing Estimator", Proc. OCEANS 2003, vol. 4, pp. 2127-2132 (2003).

Derkx, et al. "Theoretical Analysis of a First-Order Azimuth-Steerable Superdirective Microphone Array", IEEE Trans. on Audio, Speech, and Language Processing, vol. 17, No. 1, pp. 150-162 (Dec. 2008).

International Search Report and Written Opinion for International Patent Application No. PCT/IB2009/055879 (Jul. 30, 2010).

* cited by examiner

US 8,824,699 B2

METHOD OF, AND APPARATUS FOR, PLANAR AUDIO TRACKING

FIELD OF THE INVENTION

The present invention relates to a method of, and apparatus for, planar audio tracking.

BACKGROUND OF THE INVENTION

Techniques for tracking a source are known from the field of navigation, radar and sonar. One of the simplest source-tracking techniques employs a crossed dipole array—two dipole sensors centered at the same point and oriented at right angles.

Crossed dipoles have been used for radio direction finding since the early days of radio. S. W. Davies "Bearing Accuracies for Arctan Processing of Crossed Dipole Arrays" in Proc. OCEANS 1987, vol. 19., September 1987, pp 351-356 states that for a crossed dipole array with one dipole orientated towards the north, signals proportional to the sine and cosine of the source bearing are obtained and an estimate of the source bearing, $\hat{\phi}$, can be obtained through the arctan of the ratio of these components. If there is an additional omnidirectional sensor located at the centre of the crossed dipole array, then its output may be used for synchronous detection of the "sense" or sign of the sine and cosine outputs; this allows the use of a four quadrant inverse tangent function to obtain unambiguous bearing estimates. This article studies the properties of a bearing estimator based on time-averaged products of the omnidirectional sensor $u_o(t)$, with north-south oriented ("cosine") dipole output, $u_c(t)$, and east-west oriented ("sine") dipole output, $u_s(t)$.

U.S. Pat. No. 6,774,934 relates to camera positioning means used to point a camera to a speaking person in a video conferencing system. In order to find the correct direction for a camera, the system is required to determine the position from which the sound is transmitted. This is done by using at least two microphones receiving the speech signal and measuring the transmission delay between the signals received by the microphones. The delay is determined by first determining the impulse responses $(h_1)$ and $(h_2)$ and subsequently calculating a cross correlation function between these impulse responses. From the main peak in the cross correlation function, the delay value is determined. The described system is satisfactory when the microphones are spaced sufficiently wide apart that a delay value can be determined.

A drawback of currently known audio tracking techniques is that the dominant reflection of the audio source (via walls and tables for example) negatively influences the result of the audio-tracking.

SUMMARY OF THE INVENTION

An object of the present invention is to be able to derive a bearing from closely spaced microphones.

According to one aspect of the present invention there is provided a method of planar audio tracking using at least three from which virtual first and second cross-dipole microphones and a virtual monopole microphone are constructed, the method comprising directional pre-processing signals from the first and second cross-dipole microphones and the monopole microphone, filtering the results of the directional pre-processing of the signals, identifying functions representative of impulse responses from desired audio source(s) to the first and second cross-dipole and the monopole microphones, respectively, cross-correlating the functions of the first cross-dipole and the monopole microphones and the functions of the second cross-dipole and the monopole microphones to produce respective estimates representative of the lag of the most dominant audio source, and using the estimates representative of lag to determine an angle-estimate of the most dominant source.

According to another aspect of the present invention there is provided a planar audio tracking apparatus comprising at least three from which virtual first and second cross-dipole microphones and a virtual monopole microphone are constructed, means for directional pre-processing signals from the first and second cross-dipole microphones and the monopole microphone, means for filtering the results of the directional pre-processing of the signals and identifying functions representative of impulse responses from desired audio source(s) to the first and second cross-dipole and the monopole microphones, respectively, cross-correlating means for cross-correlating the functions of the first cross-dipole and the monopole microphones and the functions of the second cross-dipole and the monopole microphones to produce respective estimates representative of the lag of the most dominant audio source, and means for using the estimates representative of lag to determine an angle-estimate of the most dominant source.

BRIEF DESCRIPTION OF THE DRAWINGS

The present invention will now be described, by way of example, with reference to the accompanying drawings, wherein.

In the drawings the same reference numerals have been used to represent corresponding features.

DETAIL DESCRIPTION OF THE INVENTION

Figure 1:
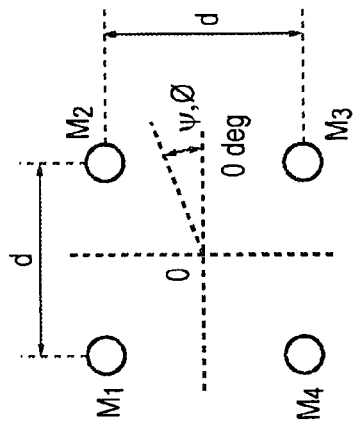
FIG. 1 shows an array of four microphones.

FIG. 1 shows a square array of four microphones $M_1$, $M_2$, $M_3$ and $M_4$ arranged symmetrically of orthogonal axes passing through an origin 0, with the horizontal axis being the zero degree axis. The length of the square between adjacent corners is distance d and the spacing between diagonal arranged microphones $M_1$ ($M_2$) and $M_3$ ($M_4$) is exactly $\sqrt{2}$ times d. The diagonally arranged microphone pairs $M_1$, $M_3$ and $M_2$, $M_4$ form dipole pole pairs and the combined outputs of all four microphones form a virtually constructed monopole microphone. An audio source X is disposed at an azimuth angle $\phi$ relative to the zero degree axis.

The normalized (frequency independent) dipole-response is computed as:

$$\overline{E_d}(\phi,\phi) = I_{ideal}^T \cdot E_d(\phi,\phi) \quad (1)$$

where:

$$E_d(\phi, \varphi) = \cos\left(\phi + \frac{\pi}{4}\right) \cdot E_d(-\pi/4, \varphi) + \sin\left(\phi + \frac{\pi}{4}\right) \cdot E_d(\pi/4, \varphi), \quad (2)$$

and where $$E_d(\pi/4, \varphi) = E_2 - E_4 \quad (3)$$
$$= S \cdot \left(e^{j \cdot \sqrt{2} \cdot \Omega \cdot \cos\left(\varphi - \frac{\pi}{4}\right)} - e^{-j \cdot \sqrt{2} \cdot \Omega \cdot \cos\left(\varphi - \frac{\pi}{4}\right)}\right),$$
$$= j \cdot 2 \cdot S \cdot \sin\left(\sqrt{2} \cdot \Omega \cdot \cos\left(\varphi - \frac{\pi}{4}\right)\right)$$

$$E_d(\pi/4, \varphi) \approx j \cdot S \cdot 2\sqrt{2} \cdot \Omega \cdot \cos\left(\varphi - \frac{\pi}{4}\right) \quad (4)$$

$$E_d(-\pi/4, \varphi) = E_3 - E_1 \quad (5)$$
$$= S \cdot \left(e^{j \cdot \sqrt{2} \cdot \Omega \cdot \cos\left(\varphi + \frac{\pi}{4}\right)} - e^{-j \cdot \sqrt{2} \cdot \Omega \cdot \cos\left(\varphi + \frac{\pi}{4}\right)}\right),$$
$$= j \cdot 2 \cdot S \cdot \sin\left(\sqrt{2} \cdot \Omega \cdot \cos\left(\varphi + \frac{\pi}{4}\right)\right)$$

$$E_d(-\pi/4, \varphi) \approx j \cdot S \cdot 2\sqrt{2} \cdot \Omega \cdot \cos\left(\varphi + \frac{\pi}{4}\right) \quad (6)$$

with $\varphi$ the angle of incidence of sound, $\phi$ the angle of the main-lobe of the superdirectional response, $E_i$ the signal picked-up by each of the microphones $M_i$, S the sensitivity of each of the microphones and $\Omega$ given by:

$$\Omega = \frac{\omega \cdot d}{2 \cdot c} \quad (7)$$

with $\omega$ the frequency (in radians), d the distance between the microphones and c the speed of sound.

The approximations for $E_d(\pi/4,\phi)$ and $E_d(-\pi/4,\phi)$ are valid for small values of $\Omega$ where the distance d is smaller than the wavelength $\lambda$ of the sound, where:

$\lambda = 2\pi/\omega$.

Furthermore $I_{ideal}$ is an ideal integrator, defined as:

$$I_{ideal} = \frac{1}{j\omega} \quad (8)$$

and T is an extra compensation term defined as $$T = \frac{c}{\sqrt{2} \cdot d} \quad (9)$$

The integrator is required to remove the j$\omega$-dependency in the dipole response.

The normalized monopole response $\overline{E_m}(\phi)$ is computed as:

$$\overline{E_m}(\varphi) = \frac{1}{4} \cdot \sum_{i=1}^{4} E_i \quad (10)$$
$$= \frac{1}{4} \cdot S \cdot \left[e^{j \cdot \sqrt{2} \cdot \Omega \cdot \cos\left(\varphi - \frac{\pi}{4}\right)} + e^{-j \cdot \sqrt{2} \cdot \Omega \cdot \cos\left(\varphi - \frac{\pi}{4}\right)} + e^{j \cdot \sqrt{2} \cdot \Omega \cdot \cos\left(\varphi + \frac{\pi}{4}\right)} + e^{-j \cdot \sqrt{2} \cdot \Omega \cdot \cos\left(\varphi + \frac{\pi}{4}\right)}\right]$$
$$= \frac{1}{2} \cdot S \cdot \left[\cos\left(\sqrt{2} \cdot \Omega \cdot \cos\left(\varphi - \frac{\pi}{4}\right)\right) + \cos\left(\sqrt{2} \cdot \Omega \cdot \cos\left(\varphi + \frac{\pi}{4}\right)\right)\right]$$

The overline indicates that the response has been normalized with a maximum response S (equal to the response of a single sensor).

The technique for audio tracking uses the signals of two orthogonal dipoles (or crossed dipoles) $\overline{E_d}(0,\phi)$ and $\overline{E_d}(\pi/2,\phi)$ in combination with the monopole $\overline{E_m}(\phi)$ to compute two (time averaged) cross-correlation values as follows:

$$X_c = x\mathrm{corr}[\overline{E_d}(0,\phi), \overline{E_m}(\phi)] \approx \cos\hat{\phi} \quad (11)$$

and:

$$X_s = x\mathrm{corr}[\overline{E_d}(\pi/2,\phi), \overline{E_m}(\phi)] \approx \sin\hat{\phi} \quad (12)$$

which approximates the sine and the cosine values of the audio source angle $\phi$.

An estimate of the angle of the audio source is now computed via the arctangent operation:

$$\hat{\phi} = \begin{cases} \tan^{-1}\left(\frac{X_s}{X_c}\right) & \text{if: } X_c \geq 0 \\ \mathrm{sgn}(X_s) \cdot \pi + \tan^{-1}\left(\frac{X_s}{X_c}\right) & \text{if: } X_c < 0 \end{cases} \quad (13)$$

The ambiguity of the arctangent can be resolved since the signs of the cosine and the sine estimates are available from equations (11) and (12).

It is noted that for bad signal-to-noise ratios, the estimate of the audio-source angle will be degraded. For the extreme case of only (2D or 3D) diffuse (that is isotropic) noise, it can be shown that the cross-dipoles and the monopoles are mutually uncorrelated and the values of $X_c$ and $X_s$ are uniformly distributed random variables. As a result, the estimate $\overline{\phi}$ will also behave as an uniform random variable between $\pm\pi$.

In order to overcome the dominant reflections of the audio source negatively influencing the result of the audio tracking, the crossed-dipole signals $\overline{E_d}(0,\phi)$ and $\overline{E_d}(\pi/2,\phi)$ and the monopole signal $\overline{E_m}(\phi)$ are applied to a filtered-sum beamformer (FSB) to be described with reference to FIG. 4. The FSB identifies functions representing an important part of the impulse responses from the audio source to the (virtual) dipole and monopole microphones. These functions will be denoted as $h_d(0)$, $h_d(\pi/2)$ and $h_m$.

Instead of computing the cross-correlation between the signals of the crossed-dipoles and the monopole as in equations (11) and (12), pairs of functions identified by the FSB are cross-correlated:

$$\psi_c = x\mathrm{corr}[h_d(0), h_m], \quad (14)$$

and $$\psi_s = x\mathrm{corr}[h_d(\pi/2), h_m]. \quad (15)$$

The lag l in $\psi_c(l)$ and $\psi_s(l)$ which is representative for the most dominant audio-source (other lags are representative for reflections) is found by:

$$l = \underset{i}{\mathrm{argmax}}\{[\psi_c(i)]^2 + [\psi_s(i)]^2\} \quad (16)$$

These cross-correlations for lag l approximates the sine and the cosine of the most dominant audio source coming from azimuth angle $\phi$ $$\psi_c(l) \approx \cos\hat{\phi}, \quad (17)$$

and $$\psi_s(l) \approx \sin\hat{\phi} \quad (18)$$

The angle estimate $\hat{\phi}$ is now computed as:

$$\hat{\phi} = \begin{cases} \tan^{-1}\left(\frac{\psi_s(l)}{\psi_c(l)}\right) & \text{if: } \psi_c(l) \geq 0 \\ \text{sgn}(\psi_s(l))\pi + \tan^{-1}\left(\frac{\psi_s(l)}{\psi_c(l)}\right) & \text{if: } \psi_c(l) < 0 \end{cases} \quad (19)$$

It is noted that an efficient cross-correlation of two vectors can be implemented via the Fast Fourier Transform.

Figure 2:
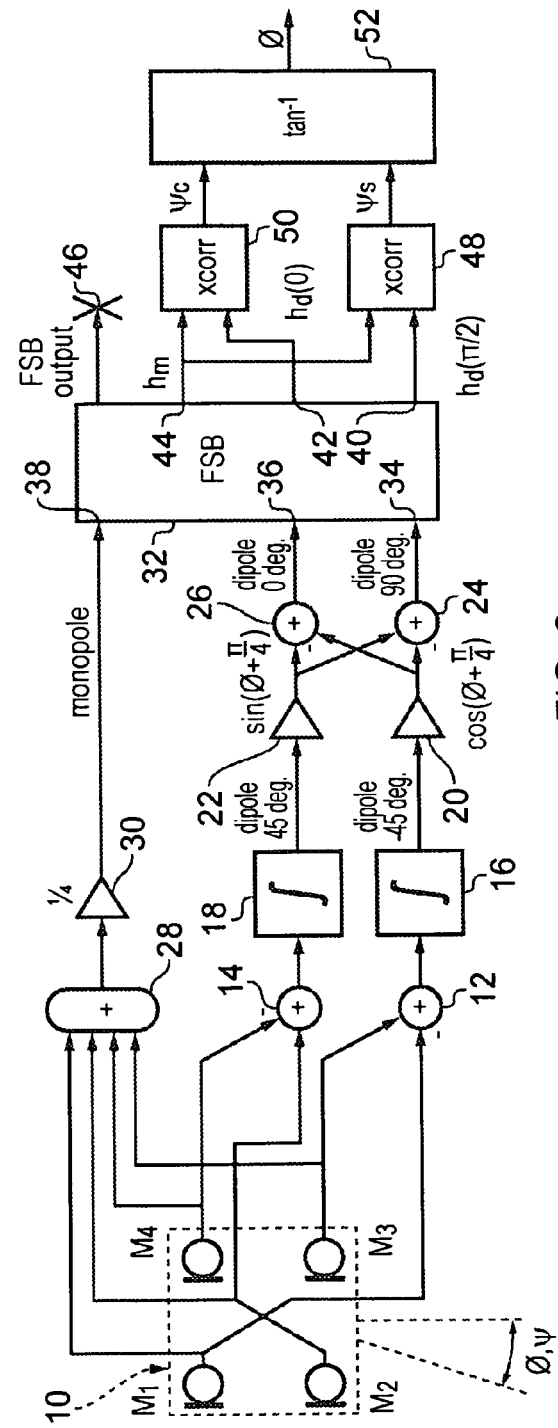
FIG. 2 is a block schematic diagram of an embodiment of an apparatus made in accordance with the present invention.

Referring to FIG. 2, the microphones are formed into a closely spaced square array 10 with a distance d between adjacent microphones being smaller than the wavelength of the sound being detected. The microphones are centered at the same point and the sound source has a bearing φ. A first cross-dipole is formed by coupling the outputs of microphones $M_1$ and $M_3$ to respective inverting and non-inverting inputs of a summing stage 12. A second cross-dipole is formed by coupling the outputs of microphones $M_2$ and $M_4$ to respective non-inverting and inverting inputs of a summing stage 14. The first and second cross-dipoles are oriented at right angles. Outputs of the summing stages 12, 14 are coupled to respective integrating stages 16, 18. The respective integrating stage 16, 18 outputs are dipole −45 degrees (or −π/4 radians) and dipole +45 degrees (or π/4 radians). These outputs are applied to respective amplifying stages 20, 22. The output from the amplifying stage 20 is applied to an inverting input of a summing stage 24 and the output from the summing stage 22 is applied to a non-inverting input of the summing stage 24. The output of the summing stage 24 comprises a degree dipole cos(φ) The output from the amplifying stage 22 is applied to a first non-inverting input of a summing stage 26 and the output from the summing stage 20 is applied to a second non-inverting input of the summing stage 26. The output of the summing stage 24 comprises a 90 degree dipole sin(φ).

A monopole signal is produced by connecting the microphones $M_1$ to $M_4$ to a summing stage 28, the output from which is applied to an attenuating amplifier 30 having a gain of ¼.

A filtered sum beamforming stage (FSB) 32 has inputs 34, 36, 38 for the dipole 90 degree signal $\overline{E_d}(\pi/2,\phi)$, the dipole 0 degree signal $\overline{E_d}(0,\phi)$ and the monopole signal $\overline{E_m}$, respectively. The FSB 32 identifies the functions $h_d(\pi/2)$, $h_d(0)$ and $h_m$ of the FSB which are representative of the impulse-responses from the desired audio source(s) to the cross-dipole microphones and the (virtually constructed) monopole microphone. In effect the FSB 32 separates the dominant audio source from the dominant reflective sources. The functions $h_d(\pi/2)$, $h_d(0)$ and $h_m$ are present on outputs 40, 42, 44, respectively. The FSB 32 has a further output 46 for an output signal which is not used in the method in accordance with the present invention. The functions $h_d(\pi/2)$ and $h_m$ on the outputs 40, 44 are applied to a first cross-correlator 48 which produces $\psi_s$ in accordance with equation (15) above. The functions in $h_d(0)$ and $h_m$ on the outputs 42, 44 are applied to a second cross-correlator 50 which produces $\psi_c$ in accordance with equation (14) above. Outputs from the cross-correlators 48 and 50 are applied to an arctangent (or $\tan^{-1}$) stage 52 which determines the lag representative of the most dominant audio source (other lags being representative of reflections) and computes an angle-estimate φ in accordance with equations (19) above.

Figure 3:
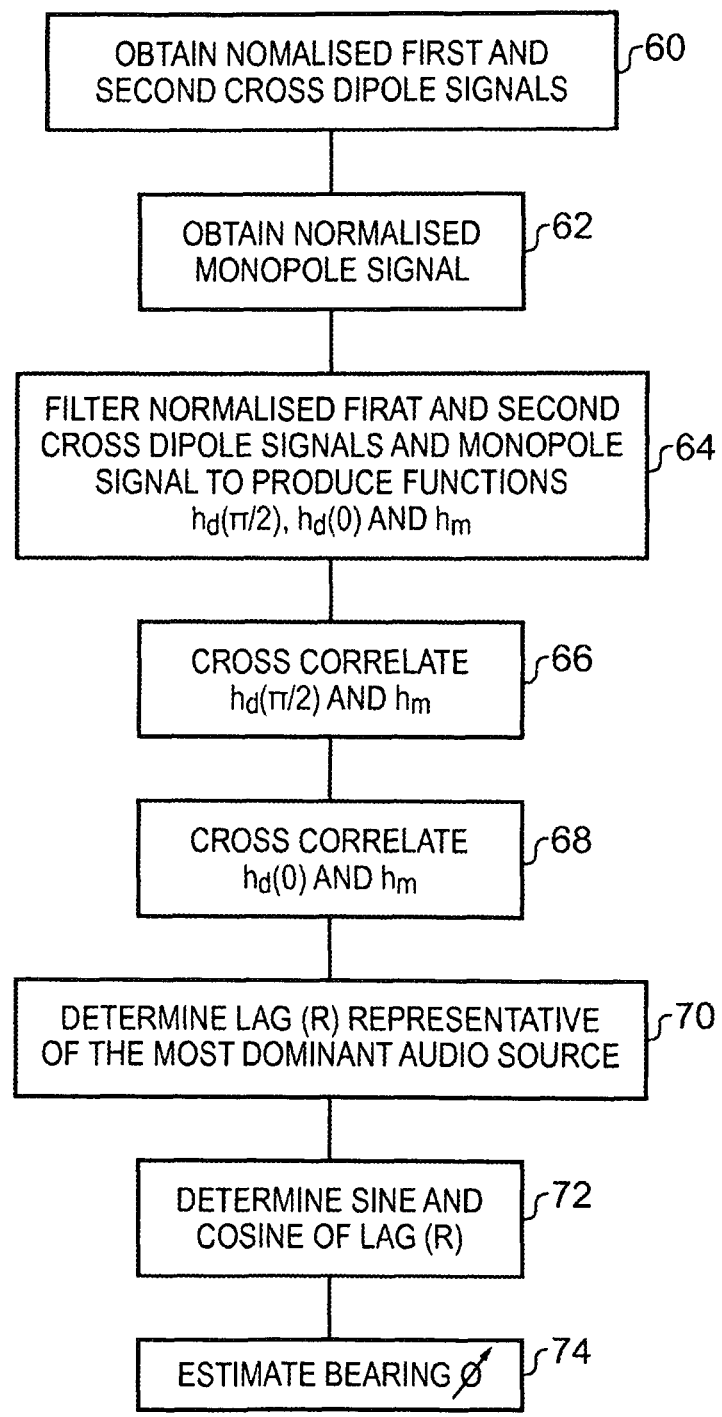
FIG. 3 is a flow chart illustrating the method in accordance with the present invention.

The angle estimate $\hat{\phi}$ is derived in accordance to the method illustrated in the flow chart shown in FIG. 3. Block 60 represents obtaining normalised cross-dipole signals. Block 62 represents obtaining a normalised monopole signal. Block 64 represents producing the first and second dipole functions and $h_d(0)$ and the monopole function $h_m$ by filtering the normalised the first and second cross-dipole signals and the monopole signal in the FSB. Block 66 represents cross-correlating the first dipole function $h_d(\pi/2)$ with the monopole function $h_m$ to produce $\psi_s$. Block 68 represents cross-correlating the second cross-dipole function $h_d(0)$ with the monopole function $h_m$ to produce $\psi_c$. Block 70 represents determining the lag l representative of the most dominant audio source. Block 72 represents determining the sine and cosine of the lag l. Finally block 74 represents estimating the bearing $\hat{\phi}$ of the audio source by obtaining the arctangent of the sine and cosine of the lag l.

Figure 4:
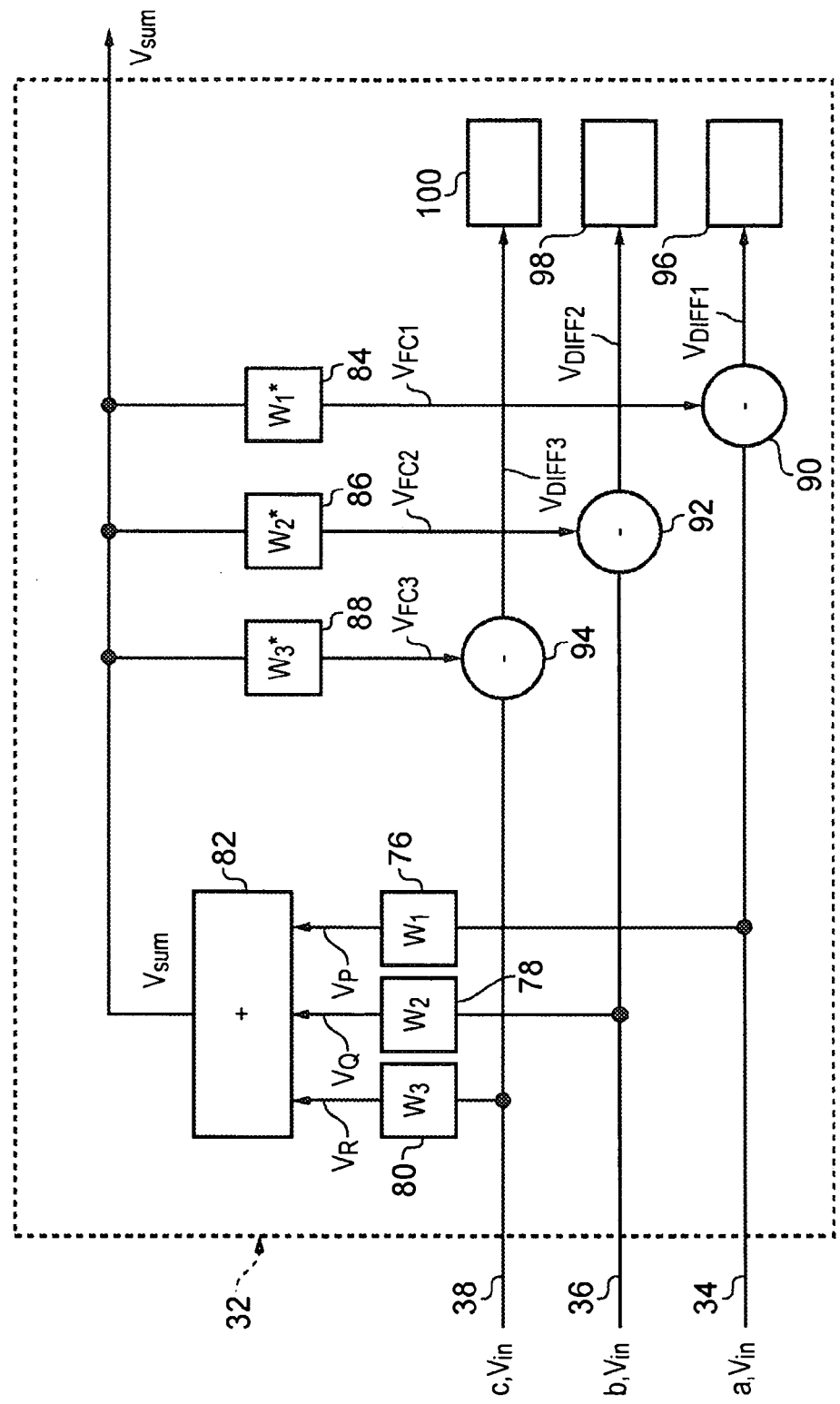
FIG. 4 is a block schematic diagram of a filtered-sum beamformer (FSB)

FIG. 4 is a block schematic diagram of a filtered-sum beamformer or FSB suitable for use with the method in accordance with the present invention. The dipole 90 degree signal $aV_{in}$, dipole 0 degree signal $bV_{in}$ and the monopole signal $cV_{in}$, where a, b and c are respective attenuation coefficients are applied to respective inputs 34, 36 and 38. The input 34 is connected to a filter 76 having a transfer function $W_1$, the input 36 is connected to a filter 78 having a transfer function $W_2$ and the input 38 is connected to a filter 80 having a transfer function $W_3$. The filters 76, 78 and 80 respectively produce processed signals $V_P$, $V_Q$ and $V_R$, each of which can be written (in the frequency domain) as:

$$V_P = aV_{in} \cdot W_1$$

$$V_Q = bV_{in} \cdot W_2$$

$$V_R = cV_{in} \cdot W_3$$

These signals are applied to a summing stage 82 which produces a combined signal:

$$V_{sum} = V_P + V_Q + V_R = aV_{in} \cdot W_1 bV_{in} \cdot W_2 cV_{in} \cdot W_3$$

$V_{sum}$ appears on the output 46 and also is applied to three further adjustable filters 90, 92, and 94 which derive filtered combined signals using transfer functions $W_1^*$, $W_2^*$ and $W_3^*$ which are the complex conjugates of $W_1$, $W_2$ and $W_3$, respectively.

The first filtered combined signal is equal to:

$$V_{FC1} = (aV_{in} \cdot W_1 + bV_{in} \cdot W_2 + cV_{in} \cdot W_3) \cdot W_1^*$$

The second filtered combined signal is equal to:

$$V_{FC2} = (aV_{in} \cdot W_1 + bV_{in} \cdot W_2 + cV_{in} \cdot W_3) \cdot W_2^*$$

The third filtered combined signal is equal to:

$$V_{FC3} = (aV_{in} \cdot W_1 + bV_{in} \cdot W_2 + cV_{in} \cdot W_3) \cdot W_3^*$$

A first difference measure between the signal $a \cdot V_{in}$ and the first filtered combined signal is determined by a subtractor 90. For the output signal of the subtractor 90 can be written:

$$V_{DIFF1} = aV_{in} - (aV_{in} \cdot W_1 + bV_{in} \cdot W_2 + cV_{in} \cdot W_3) \cdot W_1^*$$

$$= V_{in}(a - (aW_1 + bW_2 + cW_3) \cdot W_1^*)$$

A second difference measure between the signal $V_2$ and the second filtered combined signal is determined by a subtractor 92. For the output signal of the subtractor 92 can be written:

$$V_{DIFF2} = V_{in}(b - (a \cdot W_1 + b \cdot W_2 + c \cdot W_3) \cdot W_2^*)$$

A third difference measure between the signal $V_3$ and the first filtered combined signal is determined by a subtractor 94. For the output signal of the subtractor 94 can be written:

$$V_{DIFF3} = V_{in}(c - (a \cdot W_1 + b \cdot W_2 + c \cdot W_3) \cdot W_3^*)$$

The arrangement according to FIG. 4 comprises control elements 96, 98 and 100 for respectively adjusting the coefficients of the filters 76 and 84, 78 and 86 and 80 and 94 to make the power of the respective output signals $V_{DIFF1}$, $V_{DIFF2}$ and $V_{DIFF3}$ equal to zero. In order to find the values for $W_1$, $W_2$ and $W_3$ to make the difference signals equal to zero the following equations have to be solved.

In order to facilitate an understanding of the process only two of the difference equations will be considered.

$$a = (a W_1 + b W_2 + c W_3) \cdot W_1^* \quad (A)$$

$$b = (a \cdot W_1 + b \cdot W_2 + c \cdot W_3) \cdot W_2^* \quad (B)$$

Eliminating the term $(a \cdot W_1 + b \cdot W_2\ c \cdot W_3)$ in equations (A) and (B) by dividing (A) by (B) results in:

$$\frac{W_1^*}{W_2^*} = \frac{a}{b} \Rightarrow W_1^* = \frac{a \cdot W_2^*}{b} \quad (C)$$

By conjugating the left hand side and the right hand side of (C) for $W_1$:

$$\frac{W_1}{W_2} = \frac{a^*}{b^*} \Rightarrow W_1 = \frac{a^* \cdot W_2}{b^*} \quad (D)$$

Substituting (D) into (B) gives the following expression:

$$\left( \frac{|a|^2 \cdot W_2}{H_2^*} + H_2 \cdot W_2 \right) \cdot W_2^* = b \quad (E)$$

Rearranging (E) gives for $|W_2|^2$;

$$|W_2|^2 = \frac{|b|^2}{|a|^2 + |b|^2}. \quad (F)$$

For $|W|^2$ can be found in the same way:

$$|W_1|^2 = \frac{a^2}{|a|^2 + |b|^2} \quad (G)$$

From (F) and (G) it is clear that the value of $|W_1|^2$ increases when $|a|^2$ increases (or $|b|^2$ decreases) and that the value of $|W_2|^2$ increases when $|b|^2$ increases (or $|a|^2$ decreases). In such a way the strongest input signal is pronounced. This is of use to enhance a speech signal of a speaker over background noise and reverberant components of the speech signal without needing to know the frequency dependence of the paths from the speaker to the microphones as was needed in prior art arrangements.

Figure 5:
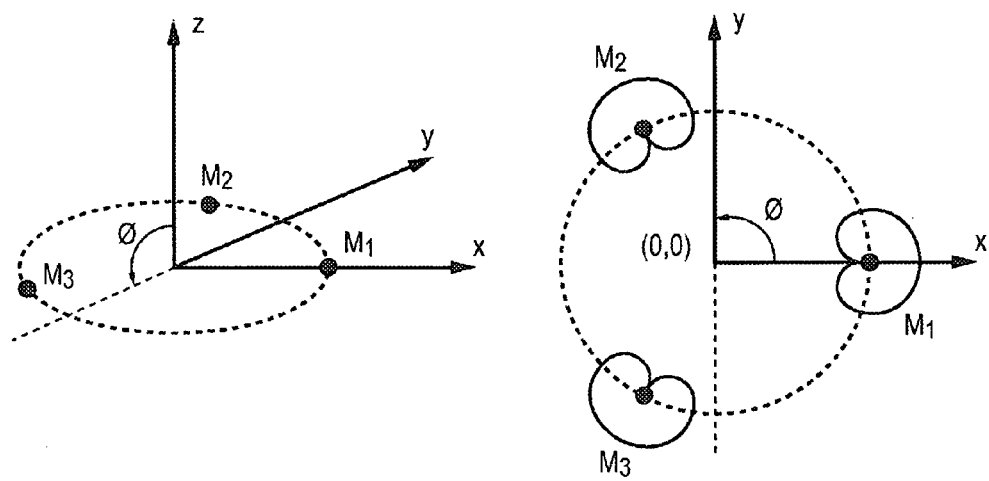
FIG. 5 shows the geometry of a circular array of three equally spaced microphones.

FIG. 5 illustrates a circular array of at least three (omni- or uni-directional microphone) sensors in a planar geometry and the application of signal processing techniques. With such an arrangement it is possible to construct a zeroth-order (that is monopole) response and two orthogonal first-order dipole responses.

Using uni-directional cardioid microphones has the main benefit, that the sensitivity for sensor-noise and sensor-mismatches is greatly reduced for the construction of the first-order dipole responses. Additionally FIG. 5 shows the construction of a monopole and two orthogonal dipoles by way of a uniformly spaced circular array of three, outwardly pointing, unidirectional cardioid microphones.

The responses of the three cardioid microphones is given by $E_c^0$, $E_c^{2\pi/3}$ and $E_c^{4\pi/3}$. Assuming that there is no uncorrelated sensor-noise, the ith cardioid microphone response is ideally given by:

$$E_c^{2i\pi/3} = \left[ \frac{1}{2} + \frac{1}{2} \cos\left(\phi - \frac{2i\pi}{3}\right) \sin\theta \right] e^{j\psi_y} \quad (20)$$

with:

$$\psi_y = \frac{2\pi f}{c} \sin\theta (p_x^i \cos\phi + p_y^i \sin\phi) \quad (21)$$

where $\theta$ and $\phi$ are the standard spherical coordinate angles, that is, elevation and azimuth.

Using $$p_x^i = r\cos\left(\phi - \frac{2i\pi}{3}\right) \quad (22)$$

and:

$$p_y^i = r\sin\left(\phi - \frac{2i\pi}{3}\right) \quad (23)$$

with r the radius of the circle we can write:

$$\psi_y = \frac{2\pi f}{c} \sin\theta \cos\left(\frac{2i\pi}{3}\right) r \quad (24)$$

From the three cardioid microphones the following monopole and orthogonal dipoles can be constructed as:

$$\begin{bmatrix} E_m \\ E_d^0 \\ E_d^{\pi/2} \end{bmatrix} = \frac{2}{3} \begin{bmatrix} 1 & 1 & 1 \\ 2 & -1 & -1 \\ 0 & \sqrt{3} & -\sqrt{3} \end{bmatrix} \begin{bmatrix} E_c^0 \\ E_c^{2\pi/3} \\ E_c^{4\pi/3} \end{bmatrix}.$$

For wavelengths larger than the size of the array, the responses of the monopole and the orthogonal dipoles are frequency invariant and ideally equal to:

$$E_m = 1 \quad (25)$$

$$E_d^0(\theta,\phi) = \cos\phi \sin\theta \quad (26)$$

$$E_d^{\pi/2}(\theta,\phi) = \cos(\phi - \pi/2)\sin\theta \quad (27)$$

Figure 6:
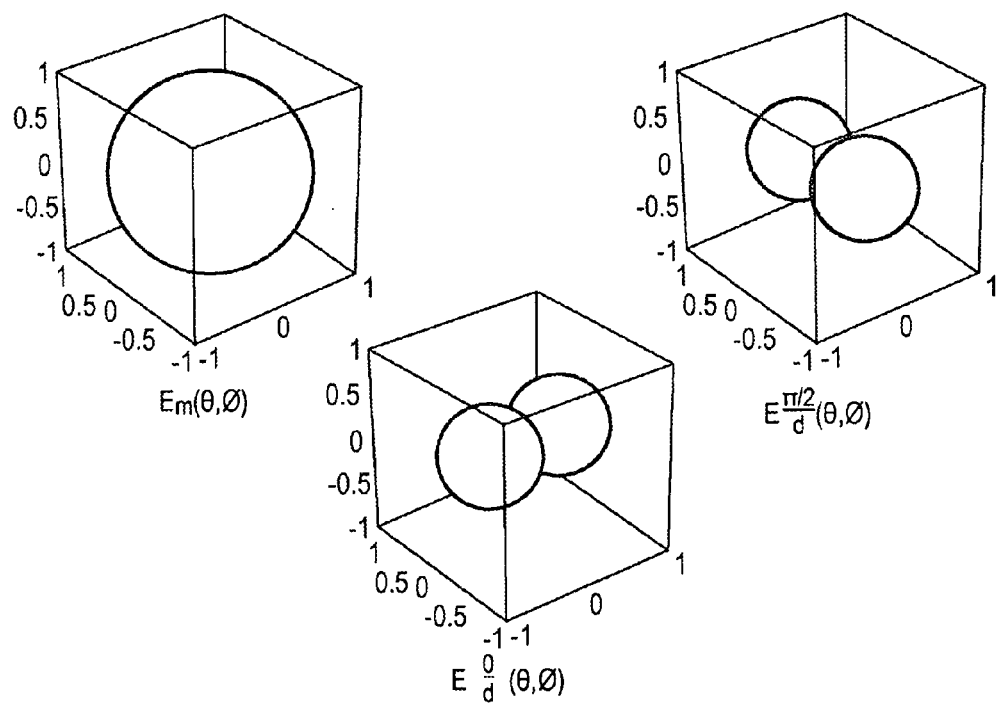
FIG. 6 shows diagrams of a monopole and two orthogonal dipoles.

The directivity patterns of these monopole and orthogonal dipoles are shown in FIG. 6.

The monopole response is referenced $E_m$ and the orthogonal dipole responses are referenced $E_d^{\pi/2}(\theta,\phi)$ and $E_d^{\pi/2}(\theta,\phi)$.

In a non-illustrated embodiment the three uni-directional cardioid microphones are arranged unequally spaced on the periphery of a circle, for example with the apices forming a right-angled triangle.

In the present specification and claims the word "a" or "an" preceding an element does not exclude the presence of a plurality of such elements. Further, the word "comprising" does not exclude the presence of other elements or steps than those listed.

The use of any reference signs placed between parentheses in the claims shall not be construed as limiting the scope of the claims.

From reading the present disclosure, other modifications will be apparent to persons skilled in the art. Such modifications may involve other features which are already known in the design, manufacture and use of planar audio tracking systems and components therefor and which may be used instead of or in addition to features already described herein.

The invention claimed is:

1. A method of planar audio tracking using virtual first and second cross-dipole microphones and a virtual monopole microphone, the method comprising:
    directional pre-processing signals from the first and second cross-dipole microphones and the monopole microphone,
    filtering the results of the directional pre-processing of the signals,
    identifying functions representative of impulse responses from at least one desired audio source to the first and second cross-dipole and the monopole microphones, respectively,
    cross-correlating the functions of the first cross-dipole and the monopole microphones and the functions of the second cross-dipole and the monopole microphones to produce respective estimates representative of a lag of a most dominant audio source, and
    using the estimates representative of the lag to determine an angle-estimate of the most dominant source.

2. A method as claimed in claim 1, wherein the filtering of the results of directional preprocessing is carried out in a filtered-sum beamformer.

3. A method as claimed in claim 1, wherein the directional pre-processing of the signals includes obtaining normalised first and second crossed dipole signals and a normalised monopole signal.

4. A method as claimed in claim 1, wherein there are four microphones arranged as a square array.

5. A method as claimed in claim 4, wherein a length of a side of the square array is less than a wavelength of a sound of interest.

6. A method as claimed in claim 1, wherein the at least three microphones are cardioid microphones arranged as a circular array of equally spaced microphones.

7. A planar audio tracking apparatus comprising:
    virtual first and second cross-dipole microphones,
    a virtual monopole microphone,
    a processor for directional pre-processing signals from the first and second cross-dipole microphones and the monopole microphone,
    a filter for filtering the results of the directional pre-processing of the signals and identifying functions representative of impulse responses from at least one desired audio source to the first and second cross-dipole and the monopole microphones, respectively,
    a cross-correlator for cross-correlating the functions of the first cross-dipole and the monopole microphones and the functions of the second cross-dipole and the monopole microphones to produce respective estimates representative of a lag of a most dominant audio source, and
    an element for using the estimates representative of the lag to determine an angle-estimate of the most dominant source.

8. An apparatus as claimed in claim 7, wherein the filter for filtering of the results of directional preprocessing includes a filtered-sum beamformer.

9. An apparatus as claimed in claim 7, wherein the processor for directional pre-processing of the signals includes an element for obtaining normalised first and second crossed dipole signals and a normalised monopole signal.

10. An apparatus as claimed in claim 7, wherein there are four microphones arranged as a square array.

11. An apparatus as claimed in claim 10, wherein a length of a side of the square array is less than a wavelength of a sound of interest.

12. An apparatus as claimed in claim 7, wherein the at least three microphones are cardioid microphones arranged as a circular array of equally spaced microphones.

* * * * *